United States Patent Office 3,733,229
Patented May 15, 1973

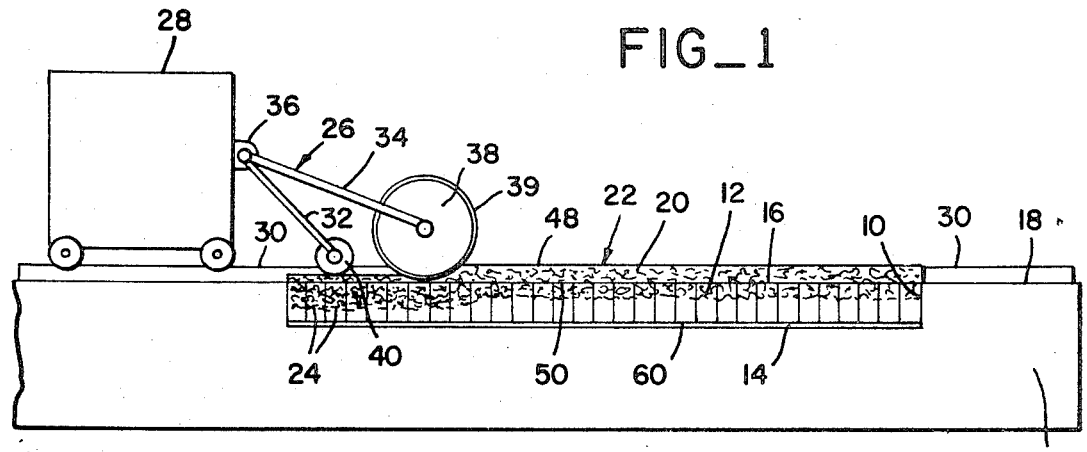
FIG_1
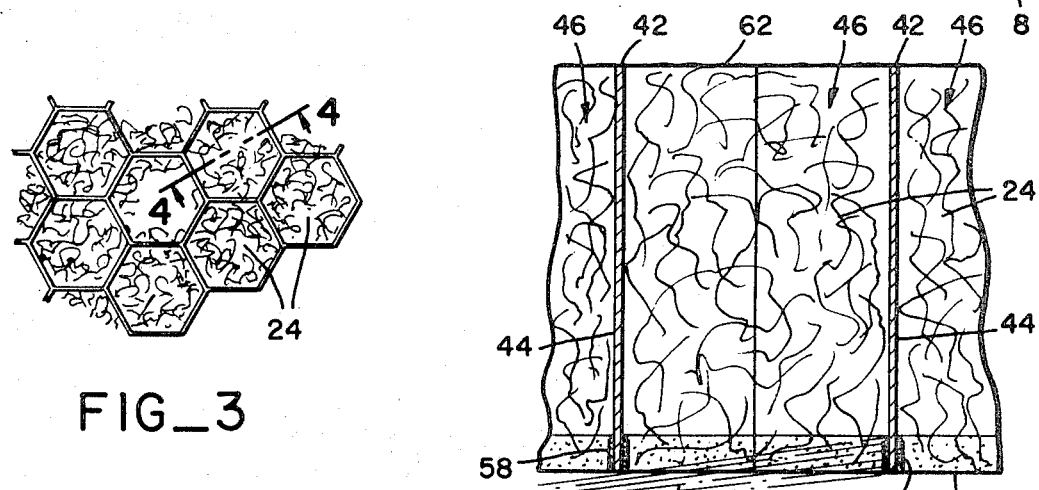
FIG_3
FIG_4
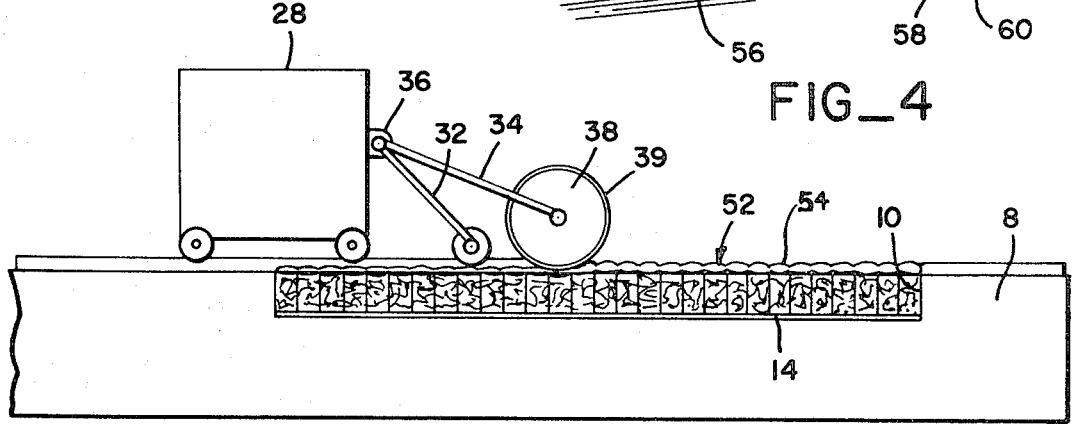
FIG_2

3,733,229
METHOD OF FILLING HONEYCOMB CORES
WITH FIBERS
Donald E. Scheer, San Ramon, and Robert G. Noble,
Castro Valley, Calif., assignors to Hexcel Corporation,
Dublin, Calif.
Filed Sept. 16, 1970, Ser. No. 72,781
Int. Cl. B31d 3/02
U.S. Cl. 156—197                    16 Claims

ABSTRACT OF THE DISCLOSURE

A method of filling honeycomb cores with thin fibers by placing the expanded core in a holding fixture, placing a mat of relatively brittle fibers on top of the core and reciprocating at least one roller across the mat until the fibers are severed along core cell walls and have been moved into the cells. Adhesive or resinous materials are applied to the core and/or the fibers to retain the fibers in the cells during handling of the filled core.

BACKGROUND OF THE INVENTION

Honeycomb cores are presently in wide use for the construction of interior panelings, wall partitions, doors and the like in the form of honeycomb sandwiches in which a pair of facings are bonded to the sides of the core. Because of the light-weight, such cores are particularly well suited for applications on aircraft.

Drawbacks of honeycomb sandwiches are their poor sound absorbing and thermal insulating qualities. It has therefore been proposed to fill honeycomb cells with foam material, particularly by forming the materials in-situ or by crushing preformed foams into the cells to improve their sound absorbing and thermal insulating qualities. However, such foam filled honeycomb cores have a relatively high density.

More recently it has been suggested to fill the honeycomb cells with low density, light-weight fibers, such as glass fibers. Honeycomb cores filled with fibers exhibit excellent sound absorbing and thermal insulating characteristics. The cores are of light-weight and are ideally suited for aircraft applications.

Filling honeycomb cores with glass fibers is not easy. The fibers tend to drape over the cell walls, distribute unequally between the core cells and thus provide the core with non-uniform characteristics and often inhibit high strength bonds between the core and the facings. Such bonds, however, are a necessity for obtaining satisfactory honeycomb sandwiches.

It has been proposed to fill the cores with fibers by introducing relatively short fibers into an airflow, directionalizing the airflow parallel to the core cells and passing it therethrough while retaining the fibers in the core by means of screens or the like placed against the downstream side of the core. This method has yielded honeycomb cores and sandwiches with excellent sound absorbing and insulating characteristics which far surpassed prior art cores filled with sound absorbing and/or temperature insulating materials. However, the filling of the cores with glass fibers by introducing short fibers in a directionalized airflow is expensive and has rendered the cost of producing fiber filled honeycomb cores and honeycomb sandwiches relatively high, sometimes unacceptably high.

SUMMARY OF THE INVENTION

The present invention provides a relatively low cost method of filling honeycomb cores, and particularly light-weight paper honeycomb cores, with fibers. Briefly, the method of the present invention comprises the steps of providing an expanded honeycomb core, placing a mat of randomly distributed fibers over the core and passing a force applying member pressing the mat against the core back and forth over the mat to sever the mat into fiber sections that are pushed into cells of the core.

In the preferred embodiment of the invention, the side of the core facing the mat is sheared to provide the cell walls with relatively sharp edges that facilitate the severance of the fibers. To enhance the severance of the fibers, a curable resin or the like is first applied to the fibers and at least partially cured before the mat is placed against the side of the core. This makes the fibers more brittle, facilitates the ease with which they enter the core cells and substantially reduces the number of necessary passes of the force applying member over the mat. Moreover, to prevent fibers in the cells from accidentally dropping out of the cells during the handling of the core before facings are applied thereto the fibers are preferably fixed in the cores by the application of a resinous or adhesive material to the fibers in the core and/or to cell walls to adhere the fibers to the walls.

Honeycomb cores and sandwiches constructed in accordance with the invention have a low density in the neighborhood of between about 0.8 to 1 pound per cubic foot for the fiber filling in the cells. Thus, they have characteristics comparable to those attainable with the earlier described prior art method of filling honeycomb cores with fibers. They further have comparable sound absorbing and thermal insulating characteristics. At the same time, the cost of inserting the fibers in the cells is substantially lower than heretofore possible.

DESCRIPTION OF THE DRAWINGS

FIG. 1 is a schematic elevational view illustrating the filling of a honeycomb core with fibers in accordance with the present invention;

FIG. 2 is a side elevational view similar to FIG. 1 but illustrates the final step of moving the fibers to below or to flush the top side of the honeycomb core;

FIG. 3 is a fragmentary, enlarged plan view of a honeycomb core filled with fibrous material in accordance with the present invention; and FIG. 4 is an enlarged, cross sectional side elevational view of the honeycomb core illustrated in FIG. 3 and is taken on line 4—4 of FIG. 3.

DESCRIPTION OF THE PREFERRED EMBODIMENTS

Referring first to FIG. 1, a relatively rigid support table 8 has a cutout 10 of any desired shape such as a rectangular shape. An expanded honeycomb core 12 of the same shape as that of cutout 10 is placed in the cutout on top of a sheet 14 of the relatively high friction material such as soft rubber or plastic. The thickness of sheet 14 is chosen so that an upper side 16 of honeycomb core 12 is flush with top 18 of table 8 and is at least about 1/16 inch.

A layer of fibers 20 such as a fibrous mat 22 of the same shape as that of cutout 10 is placed on top of upper honeycomb core side 16 for insertion into cells 24 of the honeycomb. A fiber pressing mechanism 26 comprises a carriage 28 movable back and forth along rails 30 mounted to table top 18 laterally of cutout 10. Suitable drive means such as a chain or a belt drive (not separately shown) is provided for reciprocating the carriage on the rails. A pair of arms 32 and 34 are pivotable about the horizontal pivot pin 36 mounted to carriage 28. The free ends of the arms mount a first, relatively large roller 38 and a second, relatively small roller 40. The arm lengths are so selected that the rollers are spaced in the direction of travel of the carriage. The large roller includes a relatively soft, resilient sleeve 39 such as a rubber sleeve having a durometer hardness of no more than about 50. The number of rollers mounted to carriage 28 can be increased to reduce the number of required passes for pushing the fibers into the cell. Alternatively, under certain circumstances it might be desired to provide only one roller.

Referring now to FIGS. 1, 3 and 4, upon actuation of the drive mechanism (not shown) for carriage 28 pressure rollers 38 and 40 are moved across fibrous mat 22 and their weight biases the mat against upper edges 42 of cell walls 44. The vertical force biasing the fibers against the cell wall edges severs the fibers in the mat along the outlines of honeycomb core cells 24 to form individual fiber sections 46 which are incrementally moved into the cells each time the rollers pass over them until the fibers of the mat are completely severed and the fiber sections are fully inserted in the honeycomb core cells. The soft, high friction sheet 14 prevents the honeycomb core 12 from moving in cutout 10 when the rollers are reciprocated over mat 22. The rolling direction can be either in the ribbon or in the L-direction of the honeycomb.

Although the honeycomb can be constructed of any desirable material for the filling of its cells with fibers, the need for light-weight sound absorbing and thermal insulating applications of the panel, as in aircraft applications, will usually dictate the use of light-weight such as plastic or paper honeycomb. Such honeycomb, unless treated, is relatively soft, can buckle under the force exerted by rollers 38 and 40 and its edges have a tendency to fold over and thus cease to effectively function as a cutting edge for the fibers of mat 22. Soft, impregnable honeycomb materials are, therefore, impregnated with a curable resin which is, thereafter, at least partially cured to rigidify the cell walls and to prevent a loss of the fiber cutting edges defined by the cell walls.

Honeycomb is usually constructed by severing relatively thin core sections from a block of unexpanded honeycomb material. After the severance of the core sections, they are expanded to their final form. The severance of the sections is usually performed by sawing or shearing. It is preferred to shear the sections to form upper cell wall edges 42 which are relatively sharp as compared to relatively dull, fuzzy edges obtained when sawing the sections. The sharp upper cell wall edges substantially aid in the severance of the fibers of mat 22 along the cell walls.

The material for fibers 20 of mat 22 can be selected to suit the final application of the fiber filled honeycomb core. Preferably, the material selected is one that forms relatively brittle fibers that substantially facilitate the ease with which the fibers are severed along honeycomb core cell walls 44. In a presently preferred application of this invention, the honeycomb cores are filled with matted, thin glass fibers. Mats 22 are commercially available from a variety of sources and have a first, relatively dense side 48 in which the fibers are relatively closely compacted and a second side 50 of substantially lower density. The fibers themselves are relatively flexible. The insertion of the fibers in the honeycomb core cells can be performed substantially faster when the fibers are first coated with a curable resin and then subjected to heat of about 500° F. for about 10 minutes to at least partially cure the resin. This increases the brittleness of the fibers and facilitates their severance so that the number of roller passes over mat 22 can be reduced by about two-thirds from about 60 passes to about 20 passes.

It further enhances the ease with which the fibers can be severed by placing mat 22 on upper core side 16 so that the relatively low density mat side 50 contacts upper cell wall edges 42. The original, non-deformed wall edges cut readily through the low density portion of the mat and any deformation or folding of the wall edges does not take place until the cell wall edges enter the dense side 48 of the mat and have cut through most of the mat thickness. If the mat is reversed so that its relatively high density side faces core 12, deformation due to toughness of the densely interwoven fibers can take place during the initial passes of the pressure rollers. This dulls the upper wall edges and, thereafter, reduces their effectiveness in severing the fibers of the remainder of the mat. Consequently, a substantially greater number of roller passes is then needed to fully sever the mat into individual fiber sections 46.

The fluffiness of the fiber mat, and changes in their overall density between certain areas of the mat due to a non-uniformity of the mat can cause certain fiber sections to continuously protrude above upper cell wall edges 42. A soft, resilient pad 42 is therefore placed over core 12 after about 95% of the fiber section lengths have entered the cells. Pressure rollers 38, 40 are then passed over the pad. The pad compresses and enters core cells 24 and thereby pushes the full lengths of the fiber sections 46 into the cells irrespective of their relative density, fluffiness and the like. Moreover, the pad forms a protective cover over the cell wall edges against direct contact by the rollers and possible damage to the edges therefrom. The pad has a scalloped surface 54 having a scalloped size at least about equal to but preferably slightly greater than the cell size of the honeycomb core, and is constructed of a soft, resilient natural or synthetic rubber compound. After about 5 to 6 roller passes over pad 52 the latter is removed and the honeycomb core 12 filled with fibers is ready for use.

Many honeycomb core-fiber materials, and particularly aluminum honeycomb and cured resin coated glass fiber combination exhibit little friction between cell walls 44 and fiber sections 46. Consequently, the fiber sections have a tendency to fall out of the core sections unless restrained thereto. A particularly effective method of restraining the fiber sections to the cells is to spray atomized adhesive particles at an oblique angle to the cells against the cell walls. Other methods of applying the adhesive or immersion of the core in an adhesive bath can of course be substituted. Relatively narrow areas 58 of a width of about $\frac{1}{16}$ inch or less and to which adhesive droplets adhere are thereby formed. The areas extend from the corresponding cell wall edges towards the center of the cell. The adhesive is applied to the core before the core is placed in table cutout 10 and fiber sections 46 are inserted therein. The core is so positioned in the table cutout that the side of the core against which the adhesive was sprayed forms lower core side 60. After the fiber sections are fully severed from mat 22 and from each other and thus fully inserted in core cells 24, adhesive areas 58 retain the lower ends of the plugs and prevent them from dropping through the cells when the fiber filled honeycomb core is picked up from table cutout 10.

Adhesive areas 58 can be widened to extend further into the cells. This limits the depth to which fiber sections 46 enter the core cells and thus enables a control over the filling of the cells. Thus, if a particular application of a fiber filled honeycomb core requires a fiber filling of only part of the core the adhesive areas extend over that length of the cells which is to remain empty.

To prevent the fiber sections from dropping out of the core cells when the cell is inverted from the position it is illustrated in, in FIGS. 1 and 4, the end of fiber sections 46 adjacent upper cell wall edges 42 is sprayed with an adhesive material or, preferably, with a curable resin to form a fine dispersion 62 of droplets over the upper surface of the fiber sections which retain the plugs in the cells. The solvent in the resin is permitted to evaporate but the resin retains its sticky fiber retaining character. To facilitate the subsequent construction of honeycomb sandwiches the resin is chosen so that it is compatible with the structural resin for bonding facings to the honeycomb core.

We claim:

1. A method for filling honeycomb cores with fibers comprising the steps of: placing a mat of fibrous material against the core, positioning a member on the mat, forcing the member against the mat and the core, and moving the member horizontally with respect to the mat and the core over the mat while the force is applied perpendicular to cells of the core to sever the mat into small sections along edges of the cells and move the mat sections into the core cells.

2. A method according to claim 1 wherein the step of moving includes the step of reciprocating the force across the honeycomb core to subject the mat to the force a multiplicity of times.

3. A method according to claim 1 wherein the step of applying the force includes the step of applying a force to the section moving the sections at least temporarily beneath the core edges.

4. A method according to claim 1 including the step of permanently retarding the movement of the sections in the cells when the sections approach an opposite end of the cells.

5. A method for filling honeycomb cores with fibers comprising the steps of: positioning a relatively large fiber mat against the honeycomb core, and reciprocating horizontally with respect to the mat a relatively small member applying a force acting in a direction towards the core over the mat to cut the fibers on cell edges of the honeycomb and move the cut fibers into cells of the honeycomb.

6. A method according to claim 5 including the step of promoting the retention of the fibers in the cells after they have been placed therein, the promoting step comprising the steps of preparing cell walls adjacent the side of the core facing away from the initially positioned fibers to adhere at least some of the fibers in the cells to such wall portions.

7. A method according to claim 6 wherein the promoting step further includes the step of coating the fibers disposed adjacent the core side facing the initially positioned fibers with an adhesive material.

8. A method according to claim 5 wherein the step of moving the pressure area over the fibers comprises the steps of moving at least two pressure areas exerting unequal unit pressures and spaced in the direction of movement over the fibers.

9. A method for filling honeycomb cores with fibers comprising the steps of holding the core in its expanded form, placing relatively brittle fibers over a face of the core, reciprocating a pressure applying member over the fibers until the fibers have been severed and pressed into cells of the honeycomb, and fixing the fibers in the cells to the core to prevent the accidental drop-out of fibers from the cells.

10. A method according to claim 9 including the steps of applying a hardenable resin to the honeycomb material and curing the resin at least partially before subjecting the core to the reciprocating force.

11. A method according to claim 9 wherein the core is expanded from an unexpanded honeycomb block, and including the step of shearing the unexpanded block to form at least one sheared, relatively sharp honeycomb face, and positioning the fibers against the sheared honeycomb face to facilitate the severance of the fibers and prevent deformation of the honeycomb cell walls.

12. A method according to claim 9 wherein the step of fixing comprises the step of directing a flow of finely atomized, adhesive particles at an oblique angle to the honeycomb cells towards the core to deposit the adhesive particles along a relatively narrow area from a face of the honeycomb core towards interior portions of the cell defining honeycomb walls, and positioning the fibers against the core face opposite the face subjected to the adhesive particle flow.

13. A method according to claim 9 wherein the reciprocating of the pressure member comprises the steps of providing a plurality of rollers, biasing the rollers against the fibers and the core and reciprocating the rollers one behind the other a plurality of times across the fibers and the honeycomb core.

14. A method according to claim 9 wherein the step of placing the fibers against the core comprises the steps of providing a fiber mat having a first, relatively high density side and a second, relatively low density side, and placing the low density side of the mat against the core to facilitate the severance of the fibers and prevent a premature deformation of the cell walls from contact with the relatively high density side.

15. A method according to claim 14 including the step of applying a curable, resinous material to the mat, heating the resinous material to at least partially cure it, and thereafter placing the mat against the core so that the reciprocation of the force applying member cracks the relatively brittle fibers of the mat at about cell defining walls of the honeycomb.

16. A method according to claim 9 wherein the step of holding comprises the step of placing the expanded core on a surface exhibiting relatively high friction so that the core substantially maintains its expanded shape during the reciprocating step.

References Cited

UNITED STATES PATENTS

| | | | |
|---|---|---|---|
| 3,108,367 | 10/1963 | Christman | 29—455 LM |
| 3,630,813 | 12/1971 | Allen | 161—68 X |
| 3,031,827 | 5/1962 | Onstad et al. | 55—526 |
| 3,578,526 | 5/1971 | Harding | 156—197 |

EDWARD G. WHITBY, Primary Examiner

U.S. Cl. X.R.

156—250, 512; 161—68, 69; 264—120